(No Model.)
G. F. SIMONDS.
BALL BEARING.
No. 449,968. Patented Apr. 7, 1891.
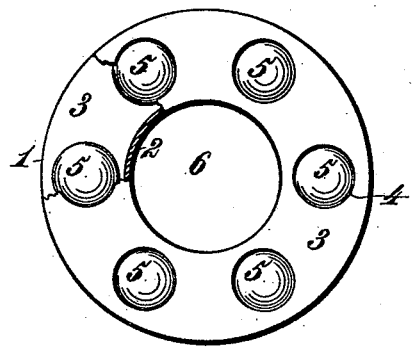
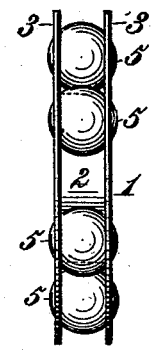
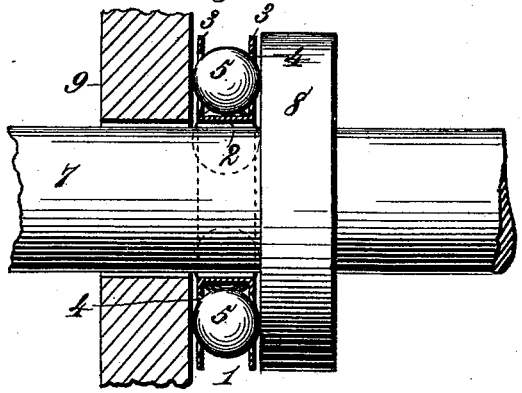
Witnesses:
Robert Emmett.
Dennis Sumby.
Inventor:
George F. Simonds.
By James L. Norris.
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 449,968, dated April 7, 1891.

Application filed January 27, 1891. Serial No. 379,309. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to that class of ball-bearings in which spherical rollers or balls are employed to resist end pressure or thrust; and the invention consists in an annular cage adapted to surround a central support and hold and retain a series of laterally-projecting balls for resisting end pressure or thrust, said balls being adapted to revolve freely in all directions and removable in a body with said cage; and the invention further consists in the construction and combination of parts in a ball-bearing for resisting thrust or end pressure, as hereinafter more fully set forth.

In the annexed drawings, illustrating the invention, Figure 1 is a sectional side elevation of my improved annular cage and confined balls for resisting end pressure or thrust. Fig. 2 is an elevation of the same in edge view. Fig. 3 is a sectional edge view of the annular cage and confined balls surrounding a shaft, axle, or other support in position to resist thrust or end pressure.

Referring to the drawings, the numeral 1 designates an annular ball-retaining cage, which consists of a central tubular body 2, that is provided with an annular externally-projecting flange 3 at each end. In the flanges 3, at opposite equidistant points outside the central body 2, are lateral openings 4, through which protrude in a lateral direction a series of spherical rollers or balls 5, that surround the central tubular cage-body 2 and project beyond the flanges 3 in position to take end-thrust and diminish friction. The opening 6 in the center of the ball-retaining cage 1 permits the cage to be placed on or around a shaft, axle, or other central support by which the spherical rollers or balls can in many instances be most conveniently disposed for diminishing friction from end-thrust.

In Fig. 3 the annular ball-retaining cage 1 is shown surrounding a central support consisting of a shaft or axle 7, having a circumferential collar or shoulder 8, that forms one of the bearings for the spherical rollers or balls 5, while the other bearing for said balls is formed by the plane vertical surface of a stationary box 9, in which the shaft or axle is supported. It is obvious, however, that for the purpose of resisting end pressure or thrust the centrally-supported cage, the balls, and the bearings may be conveniently arranged in various positions.

The annular flanged cage can be cut or swaged from a solid block of metal, or it can be spun from a metal tube, or it can be made from other suitable material in any well-known manner. A cage of this form can be readily constructed and affords a convenient means for retaining in position the balls of a thrust-bearing in such a manner that they can revolve freely in all directions and be removable in a body with the retaining-cage.

What I claim as my invention is—

1. An annular ball-retaining cage consisting of a tubular body having a central opening to receive a central support and provided with flanges having lateral openings that surround the central opening, in combination with spherical rollers or balls that are held in said cage and project through said lateral openings to resist end pressure or thrust, said balls being arranged to revolve freely in all directions and removable in a body with the cage, substantially as described.

2. An annular ball-retaining cage consisting of a central tubular body having end flanges provided with lateral openings, in combination with spherical rollers or balls that are held between said flanges and project through the lateral openings to resist end pressure or thrust, substantially as described.

3. In a ball-bearing, the combination, with a central support, of a removable annular cage consisting of a tubular flanged body provided on opposite sides with lateral openings, and a series of spherical rollers or balls confined in said cage in such a manner as to revolve freely in all directions and projecting therefrom in position to resist end pressure or thrust, said cage and balls being removable in a body, substantially as described.

In testimony whereof I have hereunto set my hand in presence of two subscribing witnesses.

GEORGE F. SIMONDS.

Witnesses:
JAMES L. NORRIS,
DENNIS SUMBY.